(12) United States Patent
Shimono et al.

(10) Patent No.: US 8,252,413 B2
(45) Date of Patent: Aug. 28, 2012

(54) LIGHT CALCIUM CARBONATE, PROCESS FOR PRODUCING THE SAME, AND PRINTING PAPER CONTAINING THE SAME

(75) Inventors: Kazuhisa Shimono, Tokyo (JP); Tatsuo Takano, Tokyo (JP); Toru Kawazu, Tokyo (JP)

(73) Assignee: Okutama Kogyo Co., Ltd. (JP)

( * ) Notice: Subject to any disclaimer, the term of this patent is extended or adjusted under 35 U.S.C. 154(b) by 545 days.

(21) Appl. No.: 12/513,122

(22) PCT Filed: Nov. 28, 2007

(86) PCT No.: PCT/JP2007/072922
§ 371 (c)(1),
(2), (4) Date: Apr. 30, 2009

(87) PCT Pub. No.: WO2008/066065
PCT Pub. Date: Jun. 5, 2008

(65) Prior Publication Data
US 2010/0068506 A1    Mar. 18, 2010

(30) Foreign Application Priority Data

Nov. 30, 2006 (JP) .................................. 2006-324426
May 21, 2007 (JP) .................................. 2007-134014

(51) Int. Cl.
*B32B 5/16* (2006.01)
(52) U.S. Cl. .................... 428/330; 428/402; 428/32.37; 423/430
(58) Field of Classification Search .................. 423/430, 423/432; 428/32.35, 32.37
See application file for complete search history.

(56) References Cited

U.S. PATENT DOCUMENTS

| 5,007,964 A | * | 4/1991 | Tsukisaka et al. | 106/464 |
| 5,468,564 A | * | 11/1995 | Ohtani et al. | 428/32.6 |
| 6,475,459 B1 | | 11/2002 | Virtanen | 423/432 |
| 7,611,606 B2 | * | 11/2009 | Soga et al. | 162/181.1 |
| 2007/0169905 A1 | | 7/2007 | Yamashita et al. | 162/181.2 |

FOREIGN PATENT DOCUMENTS

| EP | 456413 A2 | * | 11/1991 |
| JP | 3-14696 | | 1/1991 |
| JP | 6-56422 | | 3/1994 |
| JP | 7-81931 | | 3/1995 |
| JP | 2008231612 A | * | 10/2008 |
| WO | WO 2004108597 A1 | * | 12/2004 |
| WO | WO 2005098132 A1 | * | 10/2005 |

* cited by examiner

*Primary Examiner* — Jennifer McNeil
*Assistant Examiner* — Scott R. Walshon
(74) *Attorney, Agent, or Firm* — Bacon and Thomas, PLLC

(57) ABSTRACT

The light calcium carbonate in the form of microparticle aggregate of the present invention has a BET specific surface area not smaller than 10 $m^2/g$ and not larger than 25 $m^2/g$, a pore volume of 0.05 $cm^3/g$ or larger for pores having a pore diameter of 0 to 1000 Å as determined by the nitrogen adsorption method, and a pore volume ratio of 25% or more for pores having a pore diameter of 250 Å or smaller based on the total pore volume as determined by the nitrogen adsorption method, and shows an oil absorption of 100 cc/100 g or more as determined by using liquid paraffin. By using this light calcium carbonate as a filler of printing paper, superior ink absorbing property and opacity (especially opacity after printing) can be imparted to the printing paper.

3 Claims, No Drawings

LIGHT CALCIUM CARBONATE, PROCESS FOR PRODUCING THE SAME, AND PRINTING PAPER CONTAINING THE SAME

TECHNICAL FIELD

The present invention relates to highly oil-absorbing light calcium carbonate suitable for a filler for internal loading used in papermaking and printing paper using the same, especially printing paper of which opacity after printing is improved.

BACKGROUND ART

As qualities of printing paper, concealing property of paper itself (opacity as white paper) and less strike-through of ink after printing (opacity after printing) are generally required. These qualities are conventionally improved by using amorphous silica as a filler. However, for example, amorphous silica is expensive, and since ratio of used paper contained in raw material of printing paper, especially newspaper, is rapidly increasing in recent years, the papermaking process of newspaper is going to be made neutral process. Therefore, there has been desired a filler usable in a neutral environment, which can replace amorphous silica and improve opacity as white paper and opacity after printing.

Meanwhile, calcium carbonate is widely used as pigment, filler etc., and light calcium carbonate of which properties are improved for use as a filler for papermaking has also been proposed. For example, Patent document 1 proposes highly oil-absorbing calcium carbonate having a BET specific surface area of 25 to 50 $m^2/g$ and showing an oil absorption of 120 ml/100 g or higher as determined by the Ogura method (using boiled linseed oil). This calcium carbonate is in the form of linked particles obtainable by performing carbonation reaction at a starting temperature of 17 to 38° C. using a calcium hydroxide suspension containing a chelating agent etc.

The applicant of this application also proposed light calcium carbonate obtained by floc aggregation of primary particles having a large aspect ratio, which has a BET specific surface area of 8 to 20 $m^2/g$ and a pore volume of 1.5 to 3.5 $cm^3/g$, as calcium carbonate suitable for internal loading used in papermaking (Patent document 2). This calcium carbonate enables production of bulky internally filler-loaded paper when it is used as a filler, because it has a pore volume in the specific range.

Patent document 1: Japanese Patent Publication (KOKOKU) No. 5-11051
Patent document 2: International Patent Publication WO2004/108597

DISCLOSURE OF THE INVENTION

Object to be Achieved by the Invention

It is known that larger oil absorption of filler generally provides more favorable ink absorption of paper. In particular, a larger oil absorption provides higher ink strike-through prevention effect. Oil absorption of the calcium carbonate disclosed Patent document 1 is made to be 120 ml/100 g or more to realize high ink absorption. However, this calcium carbonate has a large BET specific surface area of 25 $m^2/g$ or larger, and therefore use of it as a filler invites a problem that amounts of papermaking auxiliaries to be added to paper material slurry, such as sizing agents, natural polymers and yield improving agents, are increased. Increase in amounts of papermaking auxiliaries results in increase of cost for additives and degradation of texture of paper.

Further, the carbonation used in the light calcium carbonate production process is an exothermic reaction, but in order to produce highly oil-absorbing calcium carbonate, it is conventionally necessary to maintain the reaction temperature to be within a low temperature range such as 8 to 30° C., and therefore there is a problem that the reaction temperature must be controlled by using a cooling means.

Furthermore, researches of the inventors of the present invention revealed that ink absorbing properties, especially ink absorption rate, greatly depended not only oil absorption but also diameter and distribution of pores.

Therefore, an object of the present invention is to provide light calcium carbonate having a BET specific surface area of 25 $m^2/g$ or smaller and showing large oil absorption, which can give superior ink absorbing property and opacity (especially opacity after printing) to printing paper when it is used as a filler of the printing paper.

Means for Achieving the Object

The calcium carbonate of the present invention is light calcium carbonate in the form of microparticle aggregate having a BET specific surface area not smaller than 10 $m^2/g$ and not larger than 25 $m^2/g$, a pore volume of 0.05 $cm^3/g$ or larger for pores having a pore diameter of 0 to 1000 Å and a pore volume ratio of 25% or more for pores having a pore diameter of 250 Å or smaller based on the total pore volume as determined by the nitrogen adsorption method (pore diameter distribution measurement based on nitrogen gas absorption, BJH method), and an oil absorption of 100 cc/100 g or more as determined by the liquid paraffin method (JIS K5101-13).

Because the calcium carbonate of the present invention has a pore volume of 0.05 $cm^3/g$ or larger for pores having a pore diameter of 0 to 1000 Å and a pore volume ratio of 25% or larger for pores having a pore diameter of 250 Å or smaller, it can realize high ink absorption rate and opacity after printing, when it is loaded in paper. As for opacity after printing, in particular, opacity equivalent to that obtainable with amorphous silica can be obtained.

Moreover, since the calcium carbonate of the present invention shows a BET specific surface area not higher than 25 $m^2/g$ in spite of the high oil absorbing property thereof, it can give high ink strike-through preventing effect with a small amount as a papermaking auxiliary, when it is internally loaded in paper.

The calcium carbonate of the present invention consists of aggregates comprising particles of spindle shape as primary particles, wherein the primary particles have a particle diameter of 0.05 to 0.20 μm, and secondary aggregated particles have a particle diameter of 4.0 to 6.0 μm. Because the calcium carbonate of the present invention consists of aggregates of primary particles having a particle diameter of 0.20 μm or smaller, it has a small density, and can enable production of bulky printing paper showing high degree of whiteness, when it is loaded in the paper.

The method for producing calcium carbonate of the present invention is a method for producing light calcium carbonate in the form of microparticle aggregate, which comprises the step (1) of obtaining lime emulsion by wet slaking of quick lime, the step (2) of bubbling carbon dioxide into a calcium hydroxide suspension obtained by suspending calcium hydroxide in water to perform carbonation to such an extent that carbonation ratio should be 20% or lower and thereby obtain a colloidal calcium hydroxide suspension, and the step (3) of adding the colloidal calcium hydroxide suspension obtained in the step (2) to the lime emulsion obtained in the step (1) and bubbling carbon dioxide into the mixture to allow carbonation until carbonation ratio reaches 100%.

By using the production method of the present invention, the light calcium carbonate of the present invention mentioned above can be produced with a relatively high reaction starting temperature (35 to 75° C.), However, the method for producing the light calcium carbonate of the present invention is not limited to the production method mentioned above.

Further, the printing paper of the present invention is internally filler-loaded printing paper utilizing the light calcium carbonate of the present invention mentioned above as a filler. The printing paper of the present invention has high ink absorbing property (ink strike-through prevention effect and ink absorbing rate) and high opacity, especially opacity after printing.

Hereafter, the method for producing light calcium carbonate of the present invention will be explained in detail.

In the method for producing light calcium carbonate of the present invention, a lime emulsion obtained from quicklime and a colloidal calcium hydroxide suspension obtained by partial carbonation of calcium hydroxide suspension are used as raw materials.

The lime emulsion is obtained by wet slaking of quicklime, for example, massive or powdery quicklime obtained by calcination of limestone, with water. The lime emulsion has a concentration of 90 to 150 g/L (in terms of calcium hydroxide), preferably 100 to 120 g/L.

The colloidal calcium hydroxide suspension is obtained by suspending powdery calcium hydroxide in water to obtain a calcium hydroxide slurry, bubbling a gas containing carbon dioxide into the slurry, and terminating the reaction at a carbonation ratio of 10 to 25%, preferably 15 to 20%. The calcium hydroxide slurry is made to have a concentration of 15 to 40 g/L (in terms of calcium hydroxide), preferably 25 to 35 g/L. The gas containing carbon dioxide used for the carbonation reaction is not particularly limited so long as a gas containing carbon dioxide is used, and exhaust gases such as exhaust gases of limestone calcination furnace, power generation boiler and incinerator may be used. A gas having a carbon dioxide concentration of 20% or higher is usually used. Further, the reaction starting temperature is 10 to 20° C., preferably 10 to 15° C.

The colloidal calcium hydroxide suspension is a calcium hydroxide suspension in which calcium carbonate microparticles are dispersed, and the microparticles serve as nuclei of crystals in the carbonation reaction mentioned later. By controlling reaction conditions for performing the partial carbonation such as reaction starting temperature, concentration of the suspension and carbonation ratio, shape of calcium carbonate generated by the final carbonation reaction can be controlled, and generation of fine primary particles can be promoted.

Amount of the colloidal calcium hydroxide suspension to be added to the lime emulsion is about 12 to 20 mass % of the emulsion. If the amount of the suspension is less than 12 mass %, diameters of the primary particles become large, therefore it becomes difficult to obtain the intended pore volume and oil absorption, and the effect of improving the opacity after printing of paper becomes poor, when it is used as a filler for internal loading. Further, if it is more than 20 mass %, the primary particles become too fine, and it cannot provide superior degree of whiteness and opacity of paper when it is used in the paper.

Then, a gas containing carbon dioxide is bubbled into the raw material obtained by adding the colloidal calcium hydroxide suspension to the lime emulsion, and the reaction is allowed until carbonation ratio reaches 100%. As the gas containing carbon dioxide used for this carbonation reaction, a gas similar to that used for the preparation of the colloidal calcium hydroxide suspension may be used. A gas having a carbon dioxide concentration of 20 to 50% is usually used, and it was bubbled at a rate of 1 to 30 L/minute, preferably 12 to 25 L/minute, in terms of pure carbon dioxide (100% concentration) per 1 kg of calcium hydroxide at the beginning of the reaction.

The produced calcium carbonate (aggregates) is subjected to classification, if required, and dehydrated by a known dehydration method such as centrifugal dehydration and pressurizing dehydration, and a slurry is prepared so as to have a required solid content concentration determined according to use of the slurry.

According to the production method of the present invention, the aforementioned light calcium carbonate in the form of microparticle aggregate having a BET specific surface area not smaller than 10 $m^2/g$ and not larger than 25 $m^2/g$, a pore volume of 0.05 $cm^3/g$ or larger for pores having a pore diameter of 0 to 1000 Å as determined by the nitrogen adsorption method, and a pore volume ratio of 25% or larger for pores having a pore diameter of 250 Å or smaller based on the total pore volume as determined by the nitrogen adsorption method, and showing an oil absorption of 100 cc/100 g or more as determined by using liquid paraffin can be obtained.

The calcium carbonate of the present invention can be used in the same manner as that used for conventional papermaking fillers for internal loading. For example, by adding it to a paper material slurry containing pulp, thickener, etc. so that ash content in the mixture should become 0.5% or higher and 50% or lower, and carrying out papermaking according to a usual papermaking method, internally loaded paper of the present invention can be obtained. With an ash content of 0.5% or higher, the effect as a filler can be exerted. Further, with an ash content of 50% or lower, it becomes possible to smoothly perform paper sheet making by a machine without degrading strength of paper sheet. If it is added in such an amount that the content should exceed 50%, the sizing property is degraded, and thus it is required to increase amount of sizing agent, resulting in increase of cost.

The internally loaded paper of the present invention shows superior ink absorption and superior opacity, especially opacity after printing, because of use of the calcium carbonate in the form of microparticle aggregate showing superior oil absorbing property and having a high volume ratio of fine pores as a filler for internal loading.

EXAMPLES

Hereafter, the present invention will be explained with reference to examples.

In the following examples, mean diameters of primary particles are averages of minor axis lengths of 50 calcium carbonate particles measured on a scanning electron microphotograph (SEM, magnification: ×10,000) with Digimatic Caliper. Mean diameters of secondary particles, BET specific surface areas, and pore volumes and pore distributions are values measured with a laser diffraction particle analyzer, LA-920 produced by Horiba, Ltd., Flow Sorb II produced by Micromeritics Instrument Corporation, and Tristar 3000 produced by Micromeritics Instrument Corporation, respectively. Oil absorption was measured according to JIS K5101-13 (provided that liquid paraffin was used), and ash content, density, degree of whiteness, opacity and opacity after printing were measured according to JIS P8128, JIS P8118, JIS P8148, JIS P8149, and JAPAN TAPPI No. 45, respectively.

1. Production of Light Calcium Carbonate

Example 1

<Production of Raw Materials>

Quicklime (20 kg, quicklime of JIS special grade, produced by Okutama Kogyo Co., Ltd.) was slaked by using 100 L of water at 60° C., and the slurry was stirred for 1 hour. The obtained lime emulsion was filtered through a 325 mesh sieve to remove the slaking residue, the filtrate was treated by using a three-liquid classification type liquid cyclone (TR-10, produced by Oishi Machine Inc.) at an inflow pressure of 5 kg/cm$^2$, and the lime emulsions discharged from the top (upper part) and middle (intermediate part) were transferred to the same container to obtain 180 L of a raw material lime emulsion. This lime emulsion had a concentration of 102 g/L (in terms of calcium hydroxide).

Separately, 30 L of a 30 g/L calcium hydroxide slurry obtained by suspending calcium hydroxide ("super special choice", tradename of Okutama Kogyo Co., Ltd. for one grade of its slaked lime product) in water was charged into a reaction vessel, temperature of the slurry was adjusted to 15° C., and then a carbon dioxide-containing gas having a carbon dioxide concentration of 39% was bubbled into the slurry. When the carbonation ratio reached 20%, the reaction was terminated to obtain a colloidal calcium hydroxide suspension.

<Synthesis of Calcium Carbonate>

Water was added to the raw material lime emulsion of 102 g/L to dilute the emulsion to a concentration of 100 g/L, and the diluted emulsion was charged into a reaction vessel of 30 L. After temperature of the emulsion was adjusted to 50° C., colloidal calcium hydroxide was added to the emulsion in an amount of 15 weight % in terms of weight of calcium hydroxide, and a carbon dioxide-containing gas having a carbon dioxide concentration of 30% was bubbled into the emulsion at a reaction starting temperature of 50° C., and the reaction was allowed until the carbonation ratio reached 100% to obtain calcium carbonate slurry. The obtained slurry was dehydrated by filter press, water was added to the calcium carbonate cake, and the mixture was stirred with Three One Motor to obtain a slurry of calcium carbonate in the form of microparticle aggregate having a solid content concentration of 30%.

Example 2

A slurry of calcium carbonate in the form of microparticle aggregate having a solid content concentration of 30% was obtained by performing carbonation reaction in the same manner as in the calcium carbonate synthesis of Example 1, except that the colloidal calcium hydroxide was added in an amount of 20 weight % in terms of weight of calcium hydroxide.

Comparative Example 1

Water was added to the raw material lime emulsion of 102 g/L to dilute the emulsion to a concentration of 100 g/L, and the diluted emulsion was charged into a reaction vessel of 30 L. After the temperature of the emulsion was adjusted to 20° C. as the reaction starting temperature, a carbon dioxide-containing gas having a carbon dioxide concentration of 30% was bubbled into the emulsion, and the reaction was allowed until the carbonation ratio reached 100% to obtain calcium carbonate slurry. The obtained slurry was dehydrated by filter press, water was added to the calcium carbonate cake, and the mixture was stirred with Three One Motor to obtain a slurry of calcium carbonate in the form of microparticle aggregate having a solid content concentration of 30%.

Physical properties of light calcium carbonates (powders) obtained in Examples 1 and 2 and Comparative Example 1 are shown in Table 1. Physical properties as powders of commercially available light calcium carbonate slurry for internal loading ("TP-121S" produced by Okutama Kogyo Co., Ltd.) as Comparative Example 2, commercially available bulky light calcium carbonate slurry for internal loading ("TP-221BM" produced by Okutama Kogyo Co., Ltd.) as Comparative Example 3, and commercially available amorphous silica for internal loading ("Nipsil NSP" produced by TOSOH Silica Corporation) as Comparative Example 4 are also shown in Table 1.

TABLE 1

|  | Primary particle diameter (μm) | Secondary particle diameter (μm) | BET specific surface area (m$^2$/g) | Oil absorption (ml/100 g) | Pore volume (cm$^3$/g) | Pore distribution (0 to 250 Å %) |
|---|---|---|---|---|---|---|
| Example 1 | 0.12 | 5.1 | 17 | 125 | 0.07 | 46.6 |
| Example 2 | 0.09 | 5.5 | 25 | 133 | 0.13 | 49.2 |
| Comparative Example 1 | 0.53 | 3.7 | 6 | 71 | 0.02 | 21.2 |
| Comparative Example 2 | 0.31 | 4.7 | 10 | 104 | 0.03 | 36.2 |
| Comparative Example 3 | 0.10 | 5.6 | 18 | 119 | 0.05 | 24.5 |
| Comparative Example 4 | 0.03 | 14.3 | 50 | 180 | 0.26 | 25.7 |

It can be seen that the light calcium carbonates of Examples 1 and 2 showed larger oil absorptions and had larger ratios of pores having a pore diameter of 0 to 250 Å compared with the light calcium carbonates of Comparative Examples 1 to 3.

2. Papermaking Test and Evaluation of Properties Representing Paper Quality

A papermaking test was performed as follows by using light calcium carbonates of Examples 1 and 2 and Comparative Examples 1 to 3, and amorphous silica of Comparative Example 4 as fillers, and properties representing paper quality of the obtained paper samples were evaluated.

Internal loading of filler was attained by adding each filler to fibers obtained by macerating commercial woody paper ("Tomazara" produced by Oji Paper Co., Ltd.) at a filler ash content of 4%. After the pulp slurry was diluted to 0.5 mass %, a yield improving agent ("Percol 47" produced by Ciba Speciality Chemicals Inc.) was added at a concentration of 100 ppm with respect to the fiber content to prepare a paper material, and papermaking was manually performed with a square-shaped sheet machine to obtain a sheet having a square meter basis weight of 43 g/m².

Ash content, density, degree of whiteness, opacity, and opacity after printing of the obtained sheets were measured. The results are shown in Table 2.

TABLE 2

|  | Ash content (%) | Density (g/cm²) | Degree of whiteness (%) | Opacity (%) | Opacity after printing (%) |
|---|---|---|---|---|---|
| Example 1 | 4.2 | 0.350 | 54.5 | 92.4 | 96.3 |
| Example 2 | 4.1 | 0.348 | 53.3 | 91.5 | 96.7 |
| Comparative Example 1 | 4.3 | 0.362 | 53.5 | 91.2 | 94.8 |
| Comparative Example 2 | 4.0 | 0.356 | 54.3 | 92.0 | 95.2 |
| Comparative Example 3 | 4.3 | 0.362 | 53.4 | 90.6 | 94.5 |
| Comparative Example 4 | 2.1 | 0.338 | 55.0 | 89.5 | 96.6 |

As seen from the results shown in Table 2, by using the light calcium carbonate of the present invention as a filler, properties were obtained in degrees comparative to those obtained by use of amorphous silica for degree of whiteness, opacity and opacity after printing. Density was also improved compared with the conventional light calcium carbonates.

INDUSTRIAL APPLICABILITY

According to the present invention, there is provided light calcium carbonate which is suitable for internal loading for papermaking and can replace expensive amorphous silica.

The invention claimed is:

1. Light calcium carbonate in the form of microparticle aggregates of primary microparticles, each aggregate having a BET specific surface area not smaller than 10 m²/g and not larger than 25 m²/g, a pore volume of 0.05 cm³/g or larger for pores having a pore diameter up to 1000 Å as determined by the nitrogen adsorption method, and a pore volume ratio of 25% or more for pores having a pore diameter of 250 Å or smaller based on the total pore volume as determined by the nitrogen adsorption method, having an aggregate particle diameter of 4.0 to 6.0 μm and showing an oil absorption of 100 cc/100 g or more as determined by using liquid paraffin and wherein the primary particles have a particle diameter of 0.05 to 0.20 μm.

2. The light calcium carbonate in the form of microparticle aggregates according to claim 1, wherein the primary particles are spindle-shaped.

3. Printing paper comprising a paper material and a filler loaded in the paper material, wherein the microparticle aggregate light calcium carbonate according to claim 1 is used as the filler.

* * * * *